United States Patent
Yang et al.

(10) Patent No.: US 10,653,077 B2
(45) Date of Patent: May 19, 2020

(54) PLANT PURIFICATION DEVICE AND CONTROL METHOD THEREOF

(71) Applicant: Beijing Center for Physical and Chemical Analysis, Beijing (CN)

(72) Inventors: Hua Yang, Beijing (CN); Yuxiang Zhang, Beijing (CN); Qingjun Liu, Beijing (CN); Jingming Qu, Beijing (CN)

(73) Assignee: Beijing Center for Physical and Chemical Analysis, Beijing (CN)

( * ) Notice: Subject to any disclaimer, the term of this patent is extended or adjusted under 35 U.S.C. 154(b) by 201 days.

(21) Appl. No.: 15/842,477

(22) Filed: Dec. 14, 2017

(65) Prior Publication Data

US 2018/0168112 A1    Jun. 21, 2018

(30) Foreign Application Priority Data

Dec. 15, 2016   (CN) .......................... 2016 1 1162813

(51) Int. Cl.
*B01D 53/02* (2006.01)
*A01G 9/24* (2006.01)
(Continued)

(52) U.S. Cl.
CPC .............. *A01G 9/24* (2013.01); *B01D 53/74* (2013.01); *F24F 3/1603* (2013.01); *F24F 11/74* (2018.01);
(Continued)

(58) Field of Classification Search
CPC .............. A01G 9/24; B01D 2257/7027; B01D 2257/708; B01D 2258/06;
(Continued)

(56) References Cited

U.S. PATENT DOCUMENTS 3,299,589 A * 1/1967 Hay .......................... A01G 9/24
                                                                52/71
3,474,720 A * 10/1969 Sartain .................... A01G 9/246
                                                                454/236
(Continued)

FOREIGN PATENT DOCUMENTS

CN            2753378 Y      1/2006
CN         201684544 U      12/2010
(Continued)

OTHER PUBLICATIONS

Chinese Office Action dated Feb. 19, 2019, from application No. 201611162813.6.
(Continued)

*Primary Examiner* — Christopher P Jones
(74) *Attorney, Agent, or Firm* — Foley & Lardner LLP

(57) ABSTRACT

The present disclosure relates to a plant purification device and control method thereof. A plant purification device includes a plant purification unit and a physicochemical purification unit with adjustable use efficiency, wherein, the physicochemical purification unit is communicated with the plant purification unit; the plant purification device further includes a control module, a contaminant concentration sensor for detecting concentration of indoor contaminants, an air speed detector for detecting air speed of gas entering the plant purification unit, and a fan for driving gas to be supplied into the plant purification unit from the physicochemical purification unit, wherein, the control module is used to adjust the use efficiency of the physicochemical purification unit according to the concentration of indoor contaminants, adjust rotating speed of the fan according to a detection signal of the air speed detector, and further control the air speed of the gas entering the plant purification unit.

16 Claims, 2 Drawing Sheets

(51) Int. Cl.
*F24F 3/16* (2006.01)
*F24F 13/14* (2006.01)
*F24F 11/74* (2018.01)
*B01D 53/74* (2006.01)
*F24F 110/66* (2018.01)
*F24F 13/28* (2006.01)

(52) U.S. Cl.
CPC ........ *F24F 13/14* (2013.01); *B01D 2257/708* (2013.01); *B01D 2257/7027* (2013.01); *B01D 2258/06* (2013.01); *B01D 2259/4508* (2013.01); *F24F 13/28* (2013.01); *F24F 2110/66* (2018.01)

(58) Field of Classification Search
CPC . B01D 2259/4508; B01D 53/74; F24F 11/74; F24F 13/14; F24F 13/28; F24F 2110/66; F24F 3/1603
See application file for complete search history.

(56) References Cited

U.S. PATENT DOCUMENTS

| | | | | |
|---|---|---|---|---|
| 5,315,834 | A * | 5/1994 | Garunts | A61L 9/00 62/78 |
| 9,010,019 | B2 * | 4/2015 | Mittelmark | F24F 3/16 47/66.7 |
| 9,357,718 | B1 * | 6/2016 | Lehman | A01G 31/00 |
| 2006/0169141 | A1 * | 8/2006 | Yuen | A61L 9/205 96/16 |
| 2011/0240255 | A1 * | 10/2011 | Sakashita | F24F 1/0007 165/53 |
| 2016/0038873 | A1 * | 2/2016 | Matheis | B01D 53/85 435/3 |
| 2018/0220595 | A1 * | 8/2018 | Hancock | A01G 9/24 |
| 2019/0111386 | A1 * | 4/2019 | De Paoli | F24F 13/28 |

FOREIGN PATENT DOCUMENTS

| | | |
|---|---|---|
| CN | 203329620 U | 12/2013 |
| CN | 203725028 U | 7/2014 |
| CN | 104001405 A | 8/2014 |
| CN | 104857850 A | 8/2015 |
| CN | 205627393 U | 10/2016 |

OTHER PUBLICATIONS

Chinese Office Action dated Nov. 2, 2018, from application No. 201611162813.6.

Chinese Search Report dated Oct. 25, 2018, from application No. 201611162813.6.

* cited by examiner

PLANT PURIFICATION DEVICE AND CONTROL METHOD THEREOF

TECHNICAL FIELD

The present disclosure relates to the technical field of air purification, and particularly, to a plant purification device and control method thereof.

BACKGROUND

Indoor air pollution has been listed in one of the environmental factors that are most harmful to public health. Volatile organic pollutants (VOCs) represented by benzene series, formaldehyde and the like are commonly found in construction, decoration and furnishing materials, which bring a seriously negative impact on human health. Therefore, effective management of indoor air pollution has important practical significance for protecting human health.

Nowadays, a variety of air purification devices have high purification efficiency for PM2.5, but generally, their purification effects on VOCs are poor. Studies have demonstrated that plants have a better purification effect on VOCs, but the methods to facilitate the efficient plant purification are rare in the prior art.

It has been verified in experiments that the efficiency of plant purification is closely related to the flow rate of gas containing contaminants. In order to achieve high efficiency of plant purification, it has to ensure that the flow rate of gas filtered through plants is within a certain range. The existing plant purification devices generally need to dispose a filter device at an air inlet so as to prevent plant bodies from being damaged by contaminants with high concentration, however, a filter device disposed at an air inlet will greatly reduce air speed of gas in contact with plants. Thus, there is a contradiction between the disposition of filter device and the air speed, which makes it difficult to achieve efficient plant purification.

SUMMARY

Technical Problem to be Solved

The technical problem to be solved by the present disclosure is to solve the problem of inefficient plant purification in plant purification devices in the prior art.

Technical Solution

In order to solve the above-mentioned technical problem, the present disclosure provides a plant purification device, including a plant purification unit and a physicochemical purification unit with adjustable use efficiency, wherein, the physicochemical purification unit is communicated with the plant purification unit through an air supply channel; the plant purification device further includes a control module, a contaminant concentration sensor for detecting concentration of indoor contaminants, an air speed detector for detecting air speed of gas entering the plant purification chamber, and a fan for driving gas to be supplied into the plant purification chamber from the physicochemical purification chamber, wherein, the control module is used to adjust the use efficiency of the physicochemical purification unit according to a signal of the contaminant concentration sensor, adjust rotating speed of the fan according to a detection signal of the air speed detector, and further control the air speed of the gas entering the plant purification chamber.

According to the present disclosure, the physicochemical purification unit includes a physicochemical purification chamber, and a filter and an adjustment device for adjusting amount of air passing through the filter are disposed at an air inlet of the physicochemical purification chamber.

According to the present disclosure, the adjustment device includes a shutter and a driving mechanism for driving the shutter, and the filter and the shutter are embedded in parallel at the air inlet.

According to the present disclosure, the adjustment device includes vertical chutes disposed on both sides of the air inlet, sliding rails disposed on both sides of the filter and cooperated with the chutes, and a driving mechanism for driving the filter to move up and down.

According to the present disclosure, the fan is disposed within the physicochemical purification chamber, and an outlet of the fan is communicated with the air supply channel.

According to the present disclosure, the plant purification unit includes a plant purification chamber for placing plants, and a gas retention device for prolonging period during which gas is in contact with the plants is disposed within the plant purification chamber.

According to the present disclosure, the gas retention device is a spiral flow-guide channel disposed on the inner wall of the plant purification chamber.

According to the present disclosure, an opening of the plant purification chamber is opened upward, a plurality of through holes communicated with the air supply channel are disposed at the bottom of the plant purification chamber, and the plurality of through holes are circumferentially arranged to surround a plane for placing the plants.

According to the present disclosure, a conical flow-guide device is disposed between the bottom of the plant purification chamber and the outlet of the air supply channel, an end with larger diameter of the conical flow-guide device is fixed to the bottom of the plant purification chamber, and the end with larger diameter of the conical flow-guide device is located at an center of the plane surrounded by the plurality of through holes.

The present disclosure further provides a method for controlling the above-mentioned plant purification device, including the following steps of:
S1. detecting concentration of indoor contaminants;
S2. adjusting the use efficiency of the physicochemical purification unit according to the detected concentration of contaminants;
S3. determining whether air speed of gas entering the plant purification unit is within a preset range, and adjusting the air speed by adjusting the rotating speed of the fan if the air speed is not within the preset range.

Advantageous Effects

The above technical solution of the present disclosure has the following advantages comparing with the prior art: the physicochemical purification chamber of the plant purification device according to the embodiments of the present disclosure is provided with a physicochemical purification unit with adjustable use efficiency. The use efficiency of the physicochemical purification unit is enhanced when the concentration of the indoor contaminants is too high, such that the contaminants pass through the physicochemical purification unit prior to entering the plant purification unit to be absorbed by plants, thereby preventing the plants from being damaged by indoor contaminants with excessively high concentration. At the same time, the resistance of the outside air passing through the physicochemical purification unit will be inevitably increased when the use efficiency of the physicochemical purification unit is high, which will impact the air speed. The control module in the present embodiments determines whether the air speed of the gas entering into the plant purification unit is within an air speed at which plants are capable of achieving the optimal purification effects according to the air speed detected by the air speed detector, and adjusts the rotating speed of the fan such that the air speed is within the preset range of air speed, thereby guaranteeing the plant purification effects. That is, the plant purification device provided by the present disclosure ensures the air speed is within the preset range so as to achieve an optimal plant purification effect while preventing the plant bodies from being damaged by contaminants with high concentration.

In the figures: 1. physicochemical purification chamber; 2. driving mechanism; 3. shutter; 4. sealing separator; 5. separator; 6. filter; 7. through hole; 8. spiral flow-guide channel; 9. plant purification chamber; 10. control panel; 11. contaminant concentration sensor; 12. housing; 13. plant placement region; 14. conical flow-guide device; 15. air supply channel; 16. fan; 17. electrical unit.

DETAILED DESCRIPTION

In order to make the purposes, technical solutions and advantages of the embodiments of the present disclosure more apparent, hereinafter, descriptions for the technical solutions in the embodiments of the present disclosure will be made clearly and completely in combination with the drawings in the embodiments of the present disclosure. It is apparent that the described embodiments are a part of the embodiments of the present disclosure, not all of the embodiments. All of other embodiments obtained by those of ordinary skilled in the art without creative work based on the embodiments of the present disclosure are within the scope of the present disclosure.

Figure 1:
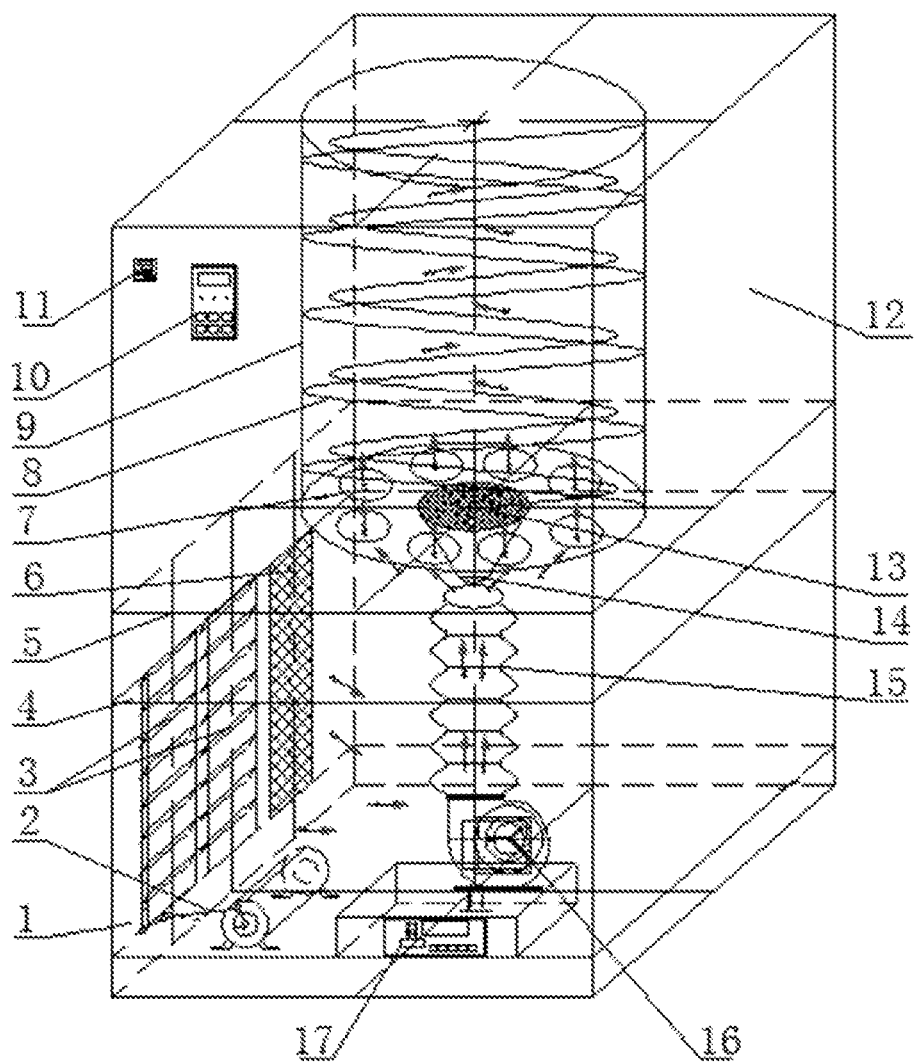
FIG. 1 is a structural schematic diagram of the plant purification device according to an embodiment of the present disclosure.

As illustrated in FIG. 1, a plant purification device according to the embodiment of the present disclosure includes a plant purification unit and a physicochemical purification unit with adjustable use efficiency, wherein, the physicochemical purification unit is communicated with the plant purification unit through an air supply channel 15. Specifically, the physicochemical purification unit in the embodiment includes a physicochemical purification chamber 1, a filter 6 disposed at an air inlet of the physicochemical purification chamber 1 and an adjustment device for adjusting amount of air passing through the filter 6. Besides, the filter 6 is preferably a filter screen; the air supply amount of the filter 6 is adjusted by the adjustment device so as to achieve the purpose that the use efficiency of the physicochemical purification unit is adjustable. It is to be noted that the adjustability of the use efficiency of the physicochemical purification unit may also be achieved by disposing multi-stage filters in the air supply direction, and thus the adjustability of the use efficiency of the physicochemical purification unit is achieved by increasing or decreasing the number of stages of the filters.

The plant purification device further includes a control module, a contaminant concentration sensor 11 for detecting concentration of indoor contaminants, an air speed detector for detecting air speed of gas entering the plant purification unit, and a fan 16 for driving gas to be supplied into the plant purification unit from the physicochemical purification unit, wherein, the control module is used to adjust the use efficiency of the physicochemical purification unit according to a signal of the contaminant concentration sensor 11, adjust rotating speed of the fan 16 according to a detection signal of the air speed detector, and further control the air speed of the gas entering the plant purification chamber 9.

The plant purification device according to the embodiments of the present disclosure is provided with a physicochemical purification unit with adjustable use efficiency. The use efficiency of the filter 6 is enhanced when the concentration of the indoor contaminants is too high, such that the contaminants pass through the physicochemical purification unit prior to entering the plant purification chamber 9 to be absorbed by plants, thereby preventing the plants from being damaged by indoor contaminants with excessively high concentration. At the same time, the resistance of the outside air entering the physicochemical purification chamber 1 will be inevitably increased when the use efficiency of the physicochemical purification unit is high, which will impact the air speed. The control module according to the present embodiments determines whether the air speed of the gas entering into the plant purification unit is within an air speed at which the plants are capable of achieving the optimal purification effects according to the air speed detected by the air speed detector, and adjusts the rotating speed of the fan 16 such that the air speed is within the preset range of air speed, thereby guaranteeing the plant purification effects. That is, the plant purification device according to the present disclosure ensures the air speed is within the preset range so as to achieve an optimal plant purification effect while preventing the plant bodies from being damaged by contaminants with high concentration.

Further, the adjustment device according to the present embodiment includes a shutter 3 and a driving mechanism 2 for driving the shutter 3, and the filter 6 and the shutter 3 are embedded in parallel at the air inlet. The driving mechanism 2 adjusts the usage efficiency of the filter 6 by driving the degree of opening and closing of the shutter 3. The air supply amount is large and the use efficiency of the filter 6 is low when the degree of opening and closing of the shutter 3 is large, such that the air speed of gas entering the filter 6 increases; the use efficiency of the filter 6 is high when the degree of opening and closing of the shutter 3 is small, such that the air speed of gas entering the filter 6 decreases. Further, the adjustment device according to the present embodiment may also be vertical chutes disposed on both sides of the air inlet, sliding rails disposed on both sides of the filter 6 and cooperated with the chutes, and a driving mechanism for driving the filter 6 to move up and down. The use efficiency of the filter 6 is adjusted by adjusting the area of the air inlet occupied by the filter 6 by driving the filter 6 to move up and down. It is to be noted that the adjustment device is not limited to the above-mentioned two forms, and may also be push-pull, fold-release and other forms that can adjust the use efficiency of the filter 6.

Further, the fan 16 according to the present embodiment is disposed within the physicochemical purification chamber 1, and an outlet of the fan 16 is communicated with the air supply channel 15. This configuration can reduce volume, and thus save space occupied by the plant purification device.

Further, the plant purification unit according to the present embodiment includes a plant purification chamber for placing plants, and a gas retention device for prolonging period during which gas is in contact with the plants is disposed within the plant purification chamber 9. The plant purification device can be disposed to be a small-sized purification device by placing plants within the plant purification chamber, which facilitates indoor placement. It is to be noted that the plant purification unit may also be a plant wall. The plant wall is divided into multiple regions when the plant wall area is large, and the air supply channel is communicated with the respective regions through branch pipelines, such that gas purified by the physicochemical purification unit blows the plants in the respective regions at the same air speed. The plant purification unit may also have other forms that can achieve plant purification.

Preferably, the gas retention device according to the present embodiment is a spiral flow-guide channel 8 disposed on the inner wall of the plant purification chamber 9. The spiral flow-guide channel 8 is disposed such that the period during which the gas stays in the plant purification chamber 9 is prolonged, the plants can fully be in contact with the gas and fully absorb contaminants in the gas, and thus purification effects can be improved. It is to be noted that the gas retention device may also be a return bend that is disposed at the outlet of the plant purification chamber and bends towards the interior of the plant purification chamber, such that the period during which the gas is in contact with the plants may be prolonged through reflux of part of the gas. The gas retention device may also utilize other mechanical structures that are capable of extending the period during which gas is in contact with plants.

Further, an opening of the plant purification chamber 9 according to the present embodiment is opened upward, a plurality of through holes 7 communicated with the air supply channel 15 are disposed at the bottom of the plant purification chamber 9, and the plurality of through holes 7 are circumferentially arranged to surround a plane for placing the plants, that is, the plant placement region 13 as illustrated in FIG. 1. The gas of the plant purification chamber 9 blows upward through the whole plant from the bottom, which facilitates structural design and full contact between the gas and the plants. Preferably, a conical flow-guide device 14 is disposed between the bottom of the plant purification chamber 9 according to the present embodiment and the outlet of the air supply channel 15, an end with larger diameter of the conical flow-guide device 14 is fixed to the bottom of the plant purification chamber 9, and the end with larger diameter of the conical flow-guide device 14 is located at an center of the plane surrounded by the plurality of through holes 7. The gas blown out from the outlet of the air supply passage 15 enters the through holes 7 along an outer side of the conical flow-guide device 14, further enters the spiral flow-guide channel 8. The disposition of the conical flow-guide device 14 facilitates circulation and dispersion of the gas, and prevents the gas from being retained before entering the plant purification unit from the air supply channel 15. Preferably, the air speed detector according to the present embodiment is disposed on the top of the plant purification chamber 9, which reflects more accurately the air speed of the gas passing through the plant purification chamber 9.

Further, the plant purification chamber 9 according to the present embodiment is disposed above the physicochemical purification chamber 1. Specifically, a sealing separator 4 is disposed on the top of the physicochemical purification chamber 1 according to the present embodiment. The air supply channel 15 passes through the sealing separator 4 to communicate with the plant purification chamber 9. The physicochemical purification chamber 1 is configured by a sealing separator 4 disposed in the middle of the housing 12 and a lower space within the housing 12. A separator 5 is disposed above the sealing separator 4. The bottom of the plant purification chamber 9 is embedded in the middle of the separator 5, and the plant purification chamber 9 is disposed as cylindrical shape. A control panel 10 is disposed outside the housing 12. A contaminant concentration sensor 11 is disposed at the outer side of the housing 1. An electrical unit 17 is also disposed at the bottom of the housing 12 to provide power for each component in the device. The plant purification device according to the embodiment of the present disclosure is designed to have compact structure and reduce the space occupied.

Figure 2:
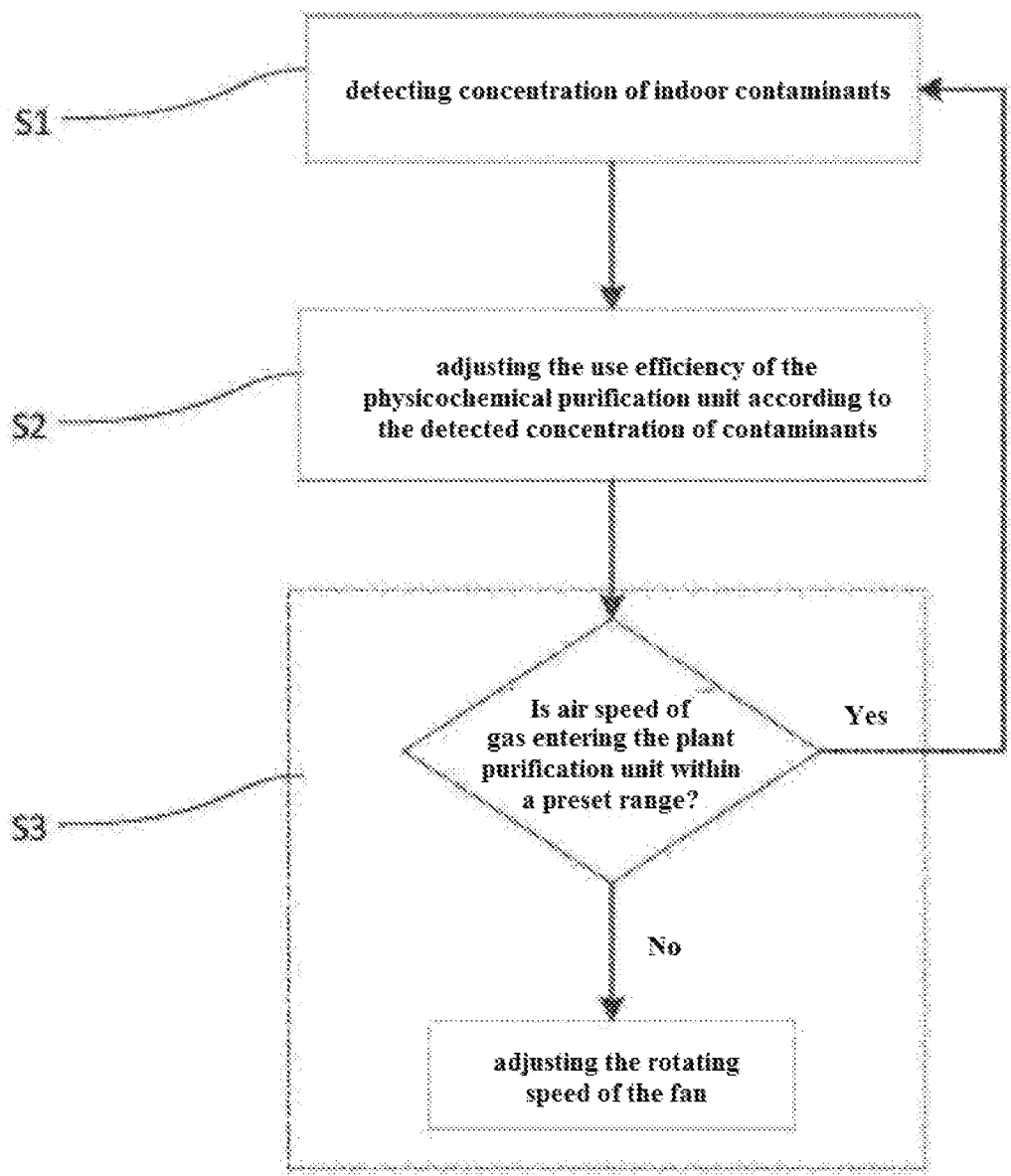
FIG. 2 is a flow schematic diagram of the method of controlling the plant purification device according to an embodiment of the present disclosure.

As illustrated in FIG. 2, a method for controlling the above-mentioned plant purification device according to the embodiment of the present disclosure includes the following steps of:

S1. detecting concentration of indoor contaminants;

S2. adjusting the use efficiency of the physicochemical purification unit according to the detected concentration of contaminants;

S3. determining whether air speed of gas entering the plant purification unit is within a preset range, and adjusting the air speed by adjusting the rotating speed of the fan 16 if the air speed is not within the preset range.

The method for controlling the above-mentioned plant purification device according to the embodiment of the present disclosure has the same effect as the above-mentioned plant purification device, which will not be described in details again.

In summary, the physicochemical purification chamber 1 of the plant purification device according to the embodiments of the present disclosure is provided with a physicochemical purification unit with adjustable use efficiency. The use efficiency of the filter screen is enhanced when the concentration of the indoor contaminants is too high, such that the contaminants pass through the physicochemical purification unit prior to entering the plant purification chamber 9 to be absorbed by plants, thereby preventing the plants from being damaged by indoor contaminants with excessively high concentration. At the same time, the resistance of the outside air entering the physicochemical purification chamber 1 will be inevitably increased when the use efficiency of the physicochemical purification unit is high, which will impact the air speed. The control module according to the present embodiments determines whether the air speed of the gas entering into the plant purification chamber 9 is within an air speed at which plants are capable of achieving the optimal purification effects according to the air speed detected by the air speed detector, and adjusts the rotating speed of the fan 16 such that the air speed is within the preset range of air speed, thereby guaranteeing the plant purification effects. That is, the plant purification device according to the present disclosure ensures the air speed is within the preset range so as to achieve an optimal plant purification effect while preventing the plant bodies from being damaged by contaminants with high concentration.

Finally, it is to be noted that the embodiments above are only used to explain the technical solutions of the present disclosure, and are not intended to be limiting thereto. Although the present disclosure has been described in detail with reference to the foregoing embodiments, it should be understood by those of ordinary skilled in the art that the technical solutions described in the foregoing embodiments may be modified or equivalently replaced with some of the technical features; while these modifications or replacements do not make the essence of corresponding technical solutions to depart from the spirit and scope of various embodiments of the present disclosure.

What is claimed is:

1. A plant purification device, characterized in that, it comprises a plant purification unit and a physicochemical purification unit with adjustable use efficiency, wherein, the physicochemical purification unit is communicated with the plant purification unit through an air supply channel; the plant purification device further comprises a control module, a contaminant concentration sensor for detecting concentration of indoor contaminants, an air speed detector for detecting air speed of gas entering the plant purification unit, and a fan arranged to receive gas from the physiochemical purification unit and to drive the received gas into the plant purification unit through the air supply channel, wherein, the control module is used to adjust the use efficiency of the physicochemical purification unit according to a signal of the contaminant concentration sensor, adjust rotating speed of the fan according to a detection signal of the air speed detector, and further control the air speed of the gas entering the plant purification unit.

2. The plant purification device of claim 1, characterized in that, the physicochemical purification unit comprises a physicochemical purification chamber, and a filter and an adjustment device for adjusting amount of air passing through the filter are disposed at an air inlet of the physicochemical purification chamber.

3. The plant purification device of claim 2, characterized in that, the adjustment device comprises a shutter and a driving mechanism for driving the shutter, and the filter and the shutter are embedded in parallel at the air inlet.

4. A plant purification device, characterized in that, it comprises a plant purification unit and a physicochemical purification unit with adjustable use efficiency, wherein, the physicochemical purification unit is communicated with the plant purification unit through an air supply channel; the plant purification device further comprises a control module, a contaminant concentration sensor for detecting concentration of indoor contaminants, an air speed detector for detecting air speed of gas entering the plant purification unit, and a fan for driving gas to be supplied into the plant purification unit from the physiochemical purification unit, wherein, the control module is used to adjust the use efficiency of the physicochemical purification unit according to a signal of the contaminant concentration sensor, adjust rotating speed of the fan according to a detection signal of the air speed detector, and further control the air speed of the gas entering the plant purification unit, wherein the physicochemical purification unit comprises a physicochemical purification chamber, and a filter and an adjustment device for adjusting amount of air passing through the filter are disposed at an air inlet of the physicochemical purification chamber, and wherein the adjustment device comprises vertical chutes disposed on both sides of the air inlet, sliding rails disposed on both sides of the filter and cooperated with the chutes, and a driving mechanism for driving the filter to move up and down.

5. The plant purification device of claim 2, characterized in that, the fan is disposed within the physicochemical purification chamber, and an outlet of the fan is communicated with the air supply channel.

6. The plant purification device of claim 2, characterized in that, the plant purification unit comprises a plant purification chamber for placing plants, and a gas retention device for prolonging period during which gas is in contact with the plants is disposed within the plant purification chamber.

7. The plant purification device of claim 6, characterized in that, the gas retention device is a spiral flow-guide channel disposed on the inner wall of the plant purification chamber.

8. The plant purification device of claim 7, characterized in that, an opening of the plant purification chamber is opened upward, a plurality of through holes communicated with the air supply channel are disposed at the bottom of the plant purification chamber, and the plurality of through holes are circumferentially arranged to surround a plane for placing the plants.

9. The plant purification device of claim 8, characterized in that, a conical flow-guide device is disposed between the bottom of the plant purification chamber and the outlet of the air supply channel, an end with larger diameter of the conical flow-guide device is fixed to the bottom of the plant purification chamber, and the end with larger diameter of the conical flow-guide device is located at an center of the plane surrounded by the plurality of through holes.

10. A method of controlling the plant purification device of claim 1, characterized in that, it comprises the following steps of:
    S1. detecting concentration of indoor contaminants;
    S2. adjusting the use efficiency of the physicochemical purification unit according to the detected concentration of contaminants;
    S3. determining whether air speed of gas entering the plant purification unit is within a preset range, and adjusting the air speed by adjusting the rotating speed of the fan if the air speed is not within the preset range.

11. The method of claim 10, further comprising removing at least some of the indoor contaminants from the gas as the gas passes through at least one of the physiochemical purification unit and the plant purification unit.

12. The plant purification device of claim 1, wherein the contaminant concentration sensor for detecting concentration of indoor contaminants is disposed on an outer side of a housing containing the plant purification unit.

13. The plant purification device of claim 1, wherein at least one of the physicochemical purification unit and the plant purification unit is configured to remove at least some of the indoor contaminants from the gas.

14. The plant purification device of claim 1, wherein the physicochemical purification unit comprises a physicochemical purification chamber, and the fan is disposed within the physicochemical purification chamber.

15. The plant purification device of claim 14, wherein an outlet of the fan is connected with the air supply channel to drive the received gas into the air supply channel, and wherein the air supply channel is in communication with the plant purification unit to communicate the gas driven by the fan to the plant purification unit.

16. The plant purification device of claim 1, wherein the physicochemical purification unit comprises a physicochemical purification chamber, the plant purification unit comprises a plant purification chamber that is separated from the physiochemical purification chamber by the air supply channel, and wherein the air supply channel has one end arranged to receive gas from an outlet of the fan and a second end in communication with the plant purification unit to communicate the gas driven by the fan to the plant purification unit.

\* \* \* \* \*